(12) United States Patent
Chang et al.

(10) Patent No.: US 9,407,099 B2
(45) Date of Patent: Aug. 2, 2016

(54) TWO-WAY DIRECT BALANCE CIRCUIT FOR SERIES CELLS

(71) Applicant: Simplo Technology Co., Ltd., Hsinchu County (TW)

(72) Inventors: Ya-Mei Chang, Taoyuan County (TW); Cherng-Huei Liang, Kaohsiung (TW)

(73) Assignee: Simplo Technology Co., Ltd., Hsinchu County (TW)

( * ) Notice: Subject to any disclaimer, the term of this patent is extended or adjusted under 35 U.S.C. 154(b) by 406 days.

(21) Appl. No.: 13/934,245

(22) Filed: Jul. 3, 2013

(65) Prior Publication Data

US 2014/0239877 A1    Aug. 28, 2014

(30) Foreign Application Priority Data

Feb. 25, 2013   (TW) .............................. 102106553 A

(51) Int. Cl.
*H02J 7/00*   (2006.01)
(52) U.S. Cl.
CPC ............. *H02J 7/0018* (2013.01); *H02J 7/0016* (2013.01)
(58) Field of Classification Search
None
See application file for complete search history.

(56) References Cited

U.S. PATENT DOCUMENTS

| | | | |
|---|---|---|---|
| 2009/0237030 A1* | 9/2009 | Oh | H02J 7/0016 320/108 |
| 2011/0140662 A1 | 6/2011 | Li | |
| 2011/0309799 A1* | 12/2011 | Firehammer | H02J 7/0016 320/134 |
| 2012/0081928 A1* | 4/2012 | Roessler | H02M 3/33576 363/21.12 |
| 2013/0049457 A1* | 2/2013 | Komatsu | H02J 7/0014 307/9.1 |
| 2014/0084868 A1* | 3/2014 | Yun | H02J 7/0063 320/118 |

FOREIGN PATENT DOCUMENTS

TW    201136101    10/2011
TW    M441267      11/2012

* cited by examiner

*Primary Examiner* — A. M. Thompson
(74) *Attorney, Agent, or Firm* — Winston Hsu; Scott Margo

(57) ABSTRACT

In a two-way direct balance circuit for series cells, a control unit activates a pulse generator to transmit high frequency switch control signals, and a flyback converter is utilized to perform electromagnetic transition between the cells that rapidly conveys power from the cells with high relative state of capacity (RSOC) to the flyback converter and to the cells with low RSOC. The direct energy transfer between cells provides fast and highly efficient performance.

10 Claims, 12 Drawing Sheets

TWO-WAY DIRECT BALANCE CIRCUIT FOR SERIES CELLS

BACKGROUND OF THE INVENTION

1. Field of the Invention

The invention relates to a battery balance circuit, and more particularly, to a battery balance circuit implemented in a battery with a number of cells connected in series and capable of balancing the power between different cells.

2. Description of the Prior Art

Most electronic devices use rechargeable battery as a power source for its advantageous convenience and capacity, in which batteries using lithium polymer as core substance are regarded as the most mature products with high capacity density specification. A rechargeable battery is primarily charged by a power supply unit or via an AC adapter from an electronic system where the rechargeable battery is installed.

The rechargeable battery is usually made of cells, each with specific capacity and connected the each other in series. During the charging or discharging process of the cells, imbalance between cells often takes place due to the state of each cell, which would shorten the life and decrease the usable capacity of the cells. Conventionally, some measures have been taken to balance the cells in an attempt to extend the life and maintain the usable capacity of the cells:

Series balance circuit in parallel with resistance. In a number of cells connected in series with one another, each cell is connected with a resistance in parallel and during the charging process, cell with higher voltage is made to consume its own power through the connected resistance. It is apparently a simple and low-cost, but far less efficient balance solution.

B. Series balance circuit with switching inductance. A number of inductances are disposed in a rechargeable battery, each connected in parallel with one of the cells. During the charging process, cell with higher voltage is forced to store the power in the inductance by turning on a switch coupled therebetween and the inductance goes on to release the power to a next cell. Given the limitation that electrons in the circuit may only be conveyed to a neighboring cell, more cells in a battery the poorer efficiency the balance solution gets.

C. Series balance circuit with switching capacitance. A number of capacitances is disposed in a rechargeable battery, each connected in parallel with its neighboring cells via two-way switches. The cells are made to balance through fast turning on and off of the switches. Sharing the same disadvantage as the previous solution, since electrons in the circuit may only be conveyed to a neighboring cell, if the power of a first cell is to be conveyed to a very last cell, through a number of middle cells, the power should have gone through repetitive storing and releasing in every intermediate capacitance. Such long path for conveying the power substantially effect the efficiency of the balance solution.

These solutions for balancing cells in a rechargeable battery all have efficiency issue while great unnecessary power loss is inevitable.

SUMMARY OF THE INVENTION

To cope with the problem, embodiments of the invention provide a two-way direct balance circuit for series cells that utilizes a flyback converter and takes advantage of electromagnetic transition to convey power between cells, which extensively reduces the power loss during the balance procedure.

An embodiment of the invention provides a two-way direct balance circuit for series cells. The two-way direct balance circuit includes a flyback converter, a first cell, a second cell, a control unit, and a pulse generator. The first cell is coupled to the flyback converter with coil and a first switch is coupled between the first cell and the flyback converter. The second cell is connected in series connection to the first cell and is coupled to the flyback converter with coil and a second switch is coupled between the second cell and the flyback converter. The control unit is coupled to the first switch and the second switch. The pulse generator is coupled to the control unit, the first switch, and the second switch and is utilized for generating a first pulse signal and a second pulse signal complementary to each other. The first pulse signal determines the turn-on frequency of the first switch and the second pulse signal determines the turn-on frequency of the second switch. When the relative state of capacity (RSOC) of the first cell is greater than the RSOC of the second cell, the control unit is utilized to activate the pulse generator such that the first pulse signal turns on the first switch and the flyback converter is utilized to convert electrical energy of the first cell into magnetic energy, and the second pulse signal turns on the second switch and the flyback converter is utilized to convert magnetic energy into electrical energy as a power supply for the second cell.

Another embodiment of the invention provides a two-way direct balance circuit for series cells. The two-way direct balance circuit provides a flyback converter, a first cell set, a second cell set, a control unit, and a pulse generator. The first cell set includes a plurality of first cells in series connection. Each of the first cells is coupled to the flyback converter with coil, and between each first cell and the flyback converter is coupled a first switch. The second cell set is connected in series connection to the first cell set. The second cell set includes a plurality of second cells in series connection. Each of the second cells is coupled to the flyback converter with coil, and between each second cell and the flyback converter is coupled a second switch. The control unit is coupled to the first switch of each first cell and the second switch of each second cell. The pulse generator is coupled to the control unit, the plurality of first switches, and the plurality of second switches and is utilized for generating a first pulse signal and a second pulse signal complementary to each other. The first pulse signal determines the turn-on frequency of the plurality of first switches and the second pulse signal determines the turn-on frequency of the plurality of second switches. When the relative state of capacity (RSOC) of one or more first cells of the first cell set is greater than the RSOC of one or more second cells of the second cell set, the control unit is utilized to activate the pulse generator such that the first pulse signal turns on the first switch of said one or more first cells and the flyback converter is utilized to convert electrical energy of said one or more first cells into magnetic energy, and the second pulse signal turns on the second switch of said one or more second cells and the flyback converter is utilized to convert magnetic energy into electrical energy as a power supply for said one or more second cells.

In the two-way direct balance circuit provided in the embodiment by the invention, the plurality of first switches and the plurality of second switches are high level turn-on switches. The two-way direct balance circuit further includes a charge pump coupled to the control unit and coupled between the pulse generator and the plurality of first switches and the plurality of second switches. The charge pump provides supplementary voltage for turning on the plurality of first switches and the plurality of second switches.

The two-way direct balance circuit provided in the embodiment by the invention further includes a plurality of first check circuits and a plurality of second check circuits. The plurality of first check circuits is coupled between the plurality of first cells respectively and the flyback converter. The plurality of second check circuits is coupled between the plurality of second cells respectively and the flyback converter. Each of the plurality of first check circuits includes a third switch and a diode in parallel connection, and each of the plurality of second check circuits includes a fourth switch and a diode in parallel connection. The control unit is coupled to the plurality of third switches and the plurality of fourth switches.

In the two-way direct balance circuit provided in the embodiment by the invention, the control unit is further utilized for monitoring the RSOC of the plurality of first cells of the first cell set and the plurality of second cells of the second cells, and is utilized for controlling the pulse generator to stop generating the first pulse signal and the second pulse signal when the RSOC of said one or more first cells and said one or more second cells is balanced.

In the two-way direct balance circuit provided in the embodiment by the invention, the first pulse signal and the second pulse signal generated by the pulse generator are high frequency pulse signals with frequency at 100 KHz.

The two-way direct balance circuit for series cells provided by the invention utilizes a control unit to activate a pulse generator to transmit high frequency switch control signals, and utilizes a flyback converter to perform electromagnetic transition between the cells that rapidly conveys power from the cells with high RSOC to the flyback converter and to the cells with low RSOC. The direct energy transfer between cells, either one to one, one to many, many to one, or many to many, provides fast and highly efficient performance.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular system components. As one skilled in the art will appreciate, manufacturers may refer to a component by different names. In the following discussion and in the claims, the terms "include" and "comprise" are used in an open-ended fashion. Also, the term "couple" is intended to mean either an indirect or direct electrical connection. Thus, if a first device is coupled to a second device, that connection may be through a direct electrical connection, or through an indirect electrical connection via other devices and connections.

Figure 1:
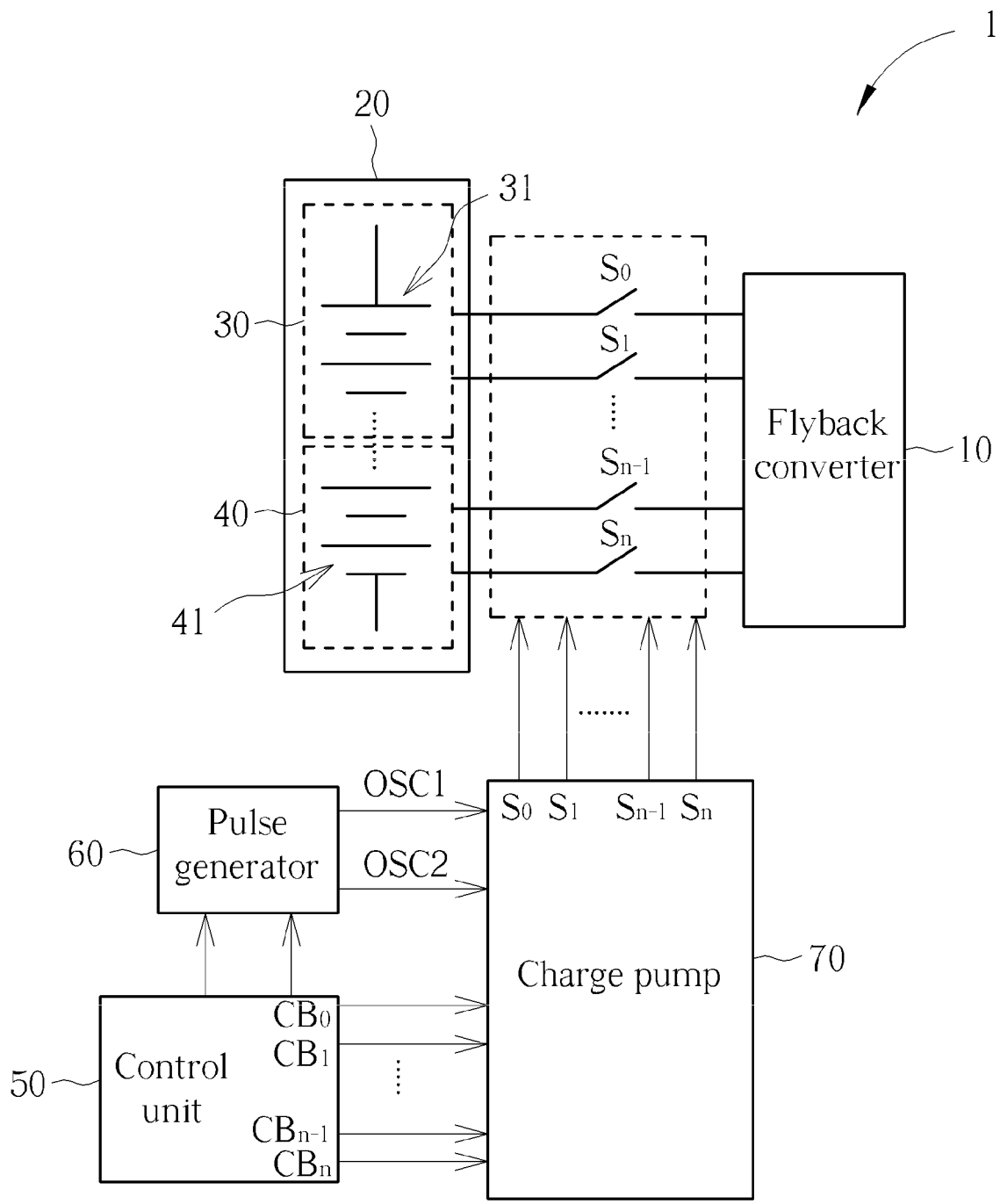
FIG. 1 is an illustration of a two-way direct balance circuit for series cells according to an embodiment of the invention.

Please refer to FIG. 1. FIG. 1 is an illustration of a two-way direct balance circuit for series cells according to an embodiment of the invention. The two-way direct balance circuit 1 may be implemented in a plurality of cells in series connection and can balance the cells by use of a flyback converter. The two-way direct balance circuit 1 includes a flyback converter 10, a battery module 20, a control unit 50, a pulse generator 60, and a charge pump 70. The battery module 20 includes a plurality of cells, which can be divided into a first cell set 30 and a second cell set 40 in series connection with the first cell set 30. The first cell set 30 includes a plurality of first cells 31 in series connection and the second cell set 40 includes a plurality of second cells 41 in series connection. Each first cell 31 and each second cell 41 are coupled to the flyback converter 10 with coil. Between each first cell 31 and the flyback converter 10, and between each second cell 41 and the flyback converter 10, switches $S_0, S_1, \ldots, S_{n-1}, S_n$ as shown in FIG. 1 are added to control the energy flow between each cell and the flyback converter 10.

The control unit 50, the pulse generator 60, and the charge pump 70 are coupled with one another. The control unit 50 is utilized for detecting and monitoring the relative state of capacity (RSOC) of each cell of the battery module 20, and based on which, the control unit 50 determines which cells should be put to the balance procedure. Control lines $CB_0, CB_1, \ldots, CB_{n-1}, CB_n$ in the control unit 50 correspond to the switches $S_0, S_1, \ldots, S_{n-1}, S_n$. For the embodiment in FIG. 1, the control lines $CB_0, CB_1, \ldots, CB_{n-1}, CB_n$ are respectively coupled to the switches $S_0, S_1, \ldots, S_{n-1}, S_n$ through the charge pump 70. Since the switches $S_0, S_1, \ldots, S_{n-1}, S_n$ are high level turn-on switches, the charge pump 70 provide a supplementary voltage for turning on each of the switches $S_0, S_1, \ldots, S_{n-1}, S_n$. In other embodiments, the charge pump 70 is optional and may be not used in the circuit such that the control unit 50 is directly coupled to and controls the switches $S_0, S_1, \ldots, S_{n-1}, S_n$. Additionally, the pulse generator 60 generates a first pulse signal OSC1 and a second pulse signal OSC2 complementary to each other and is coupled to control the turn-on duty and frequency of switches $S_0, S_1, \ldots, S_{n-1}, S_n$.

Figure 2A:
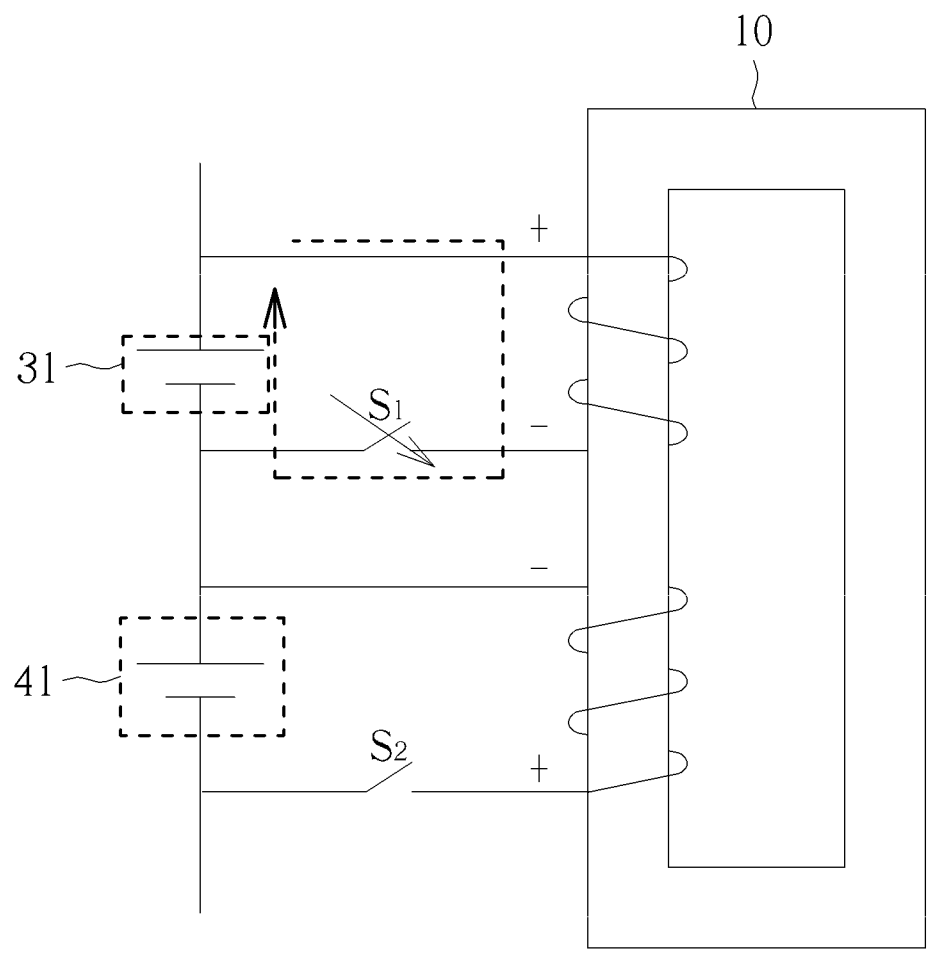
FIG. 2A, 2B are illustrations showing energy conversion between two cells through the flyback converter.
Figure 2B:
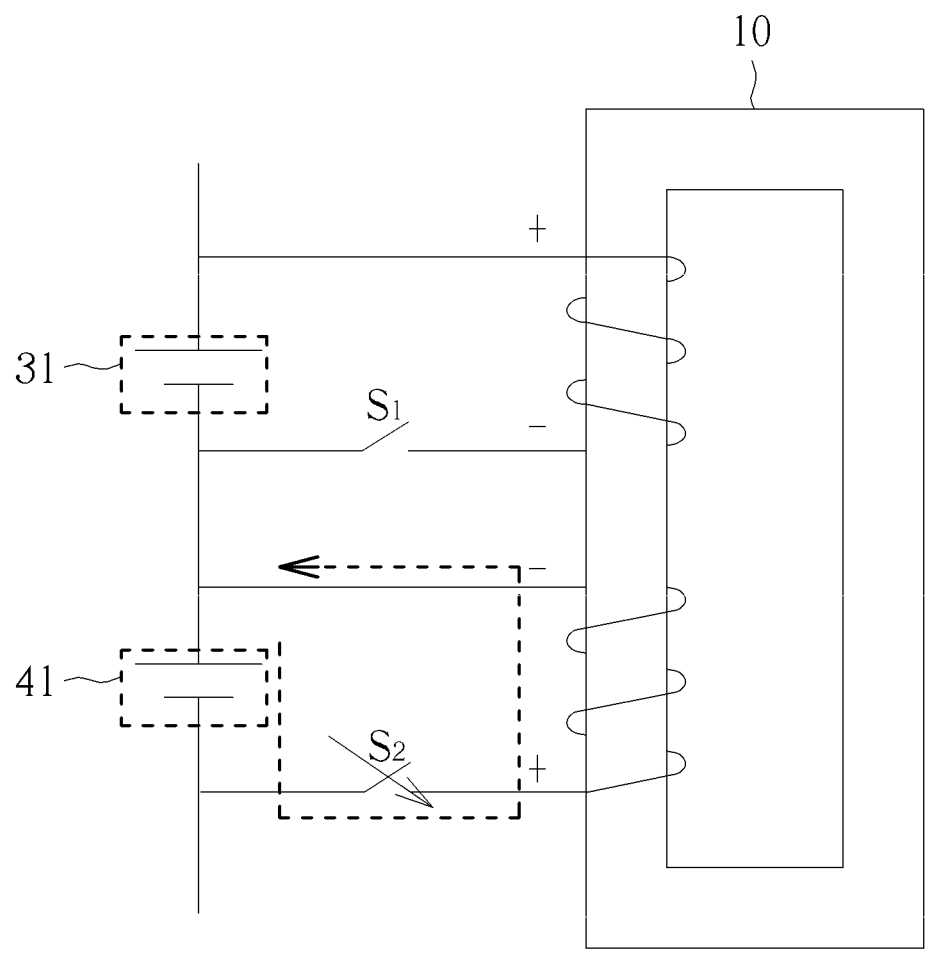

Please refer to FIG. 2A, 2B. FIG. 2A, 2B are illustrations showing energy conversion between two cells through the flyback converter. A switch $S_1$ is coupled between the first cell 31 and the flyback converter 10 and a switch $S_2$ is coupled between the second cell 41 and the flyback converter 10. When the control unit 50 has detected a larger RSOC of the first cell 31 of the first cell set 30 while the second cell 41 of the second cell set 40 has smaller RSOC, there can be a need for balancing the power between the first cell 31 and the second cell 41. Hence, in FIG. 2A, the control unit 50 turns on the switch $S_1$ such that current flows from the first cell 31 to the flyback converter 10. Coiled on the flyback converter 10, the current (electrical energy) from the first cell 31 and passing through the flyback converter 10 is converted into magnetic energy. Next, in FIG. 2B, the control unit 50 turns off the switch $S_1$ and turns on switch $S_2$ so that the magnetic energy on the flyback converter 10 will be converted into electrical energy (current) and conveyed to the second cell 41, which means to charge the second cell 41. It should be noted that in the embodiment, the flyback converter 10 makes it possible that electrical energy is conveyed between cells via energy conversion, instead of via voltage difference between the cells.

Figure 3A:
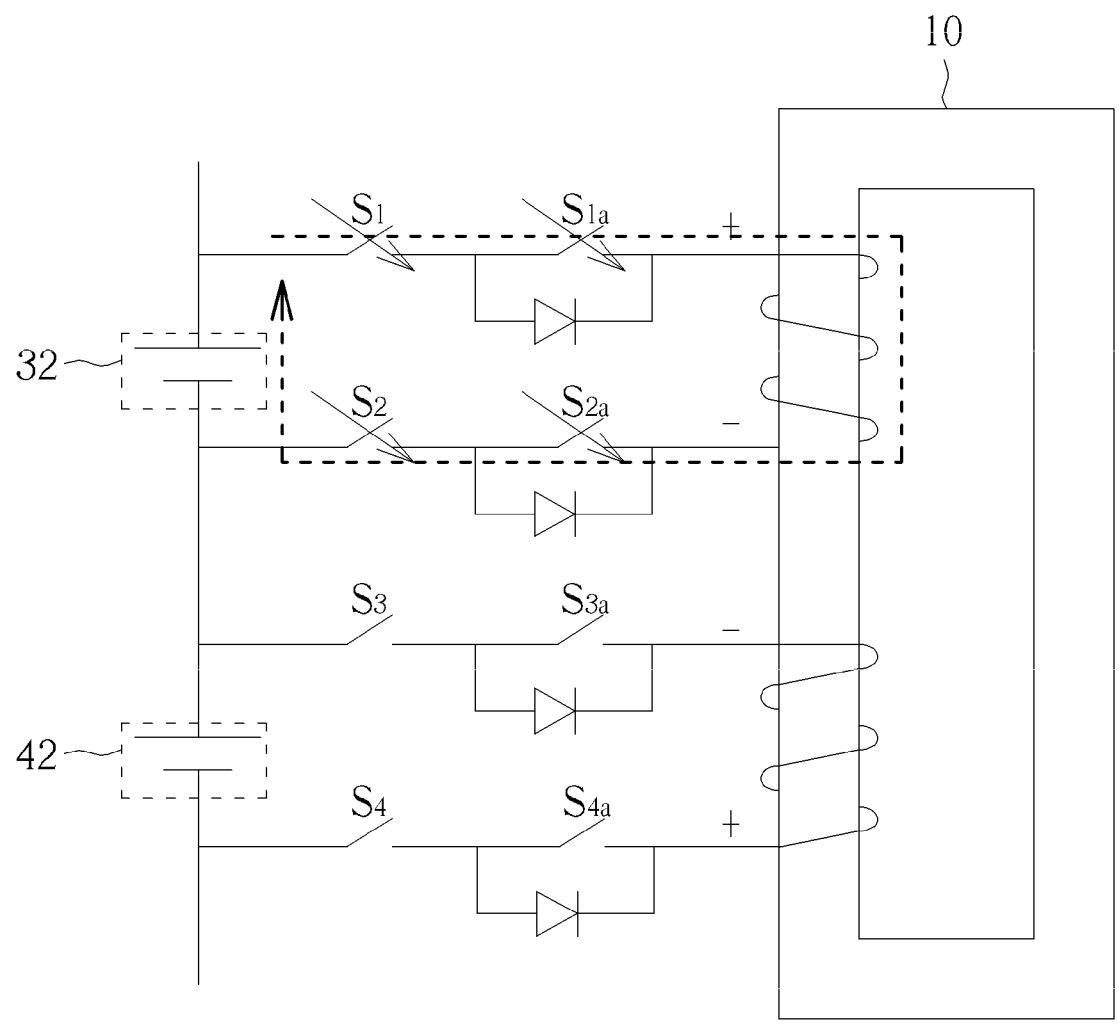
FIG. 3A, 3B are illustrations of cells and flyback converter according to an embodiment of the invention.
Figure 3B:
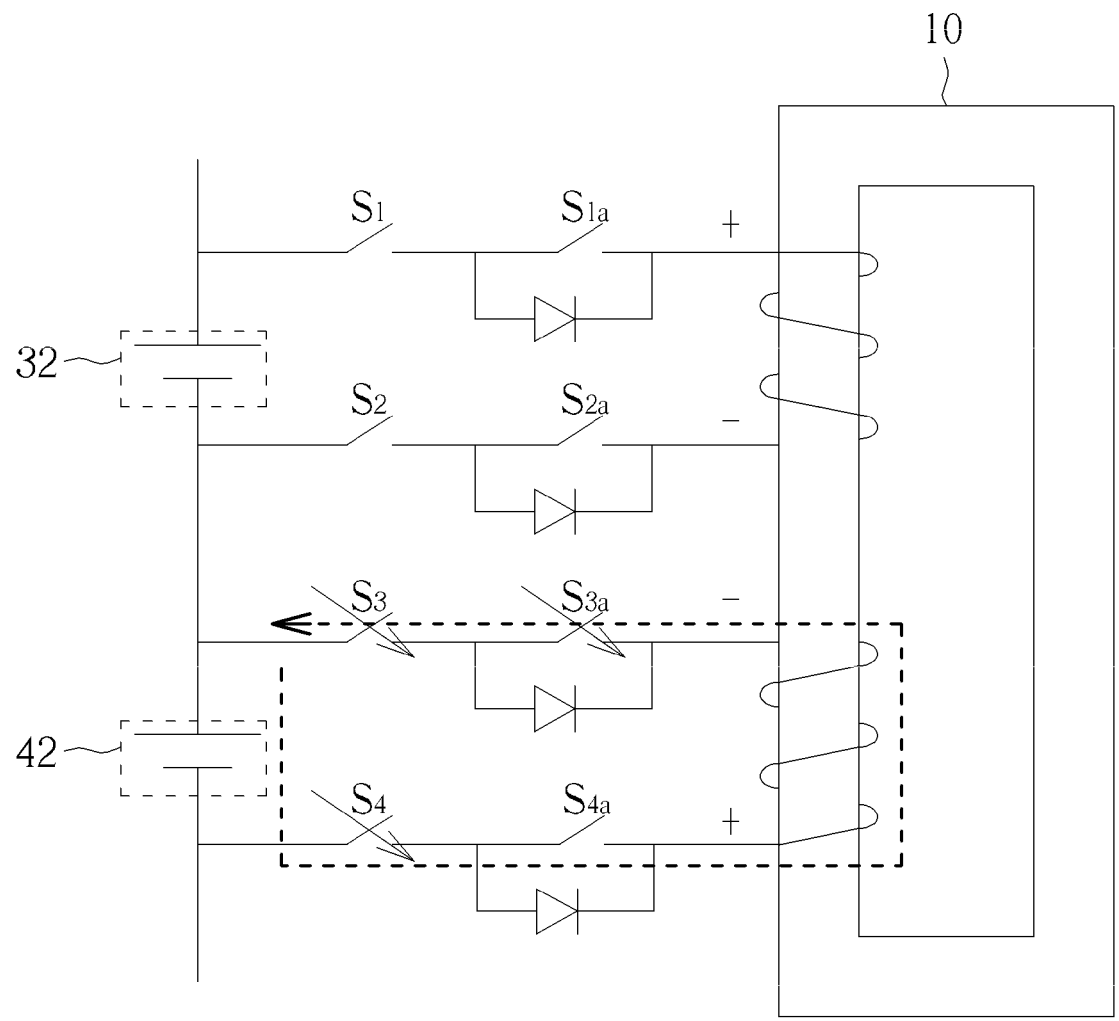
Figure 4A:
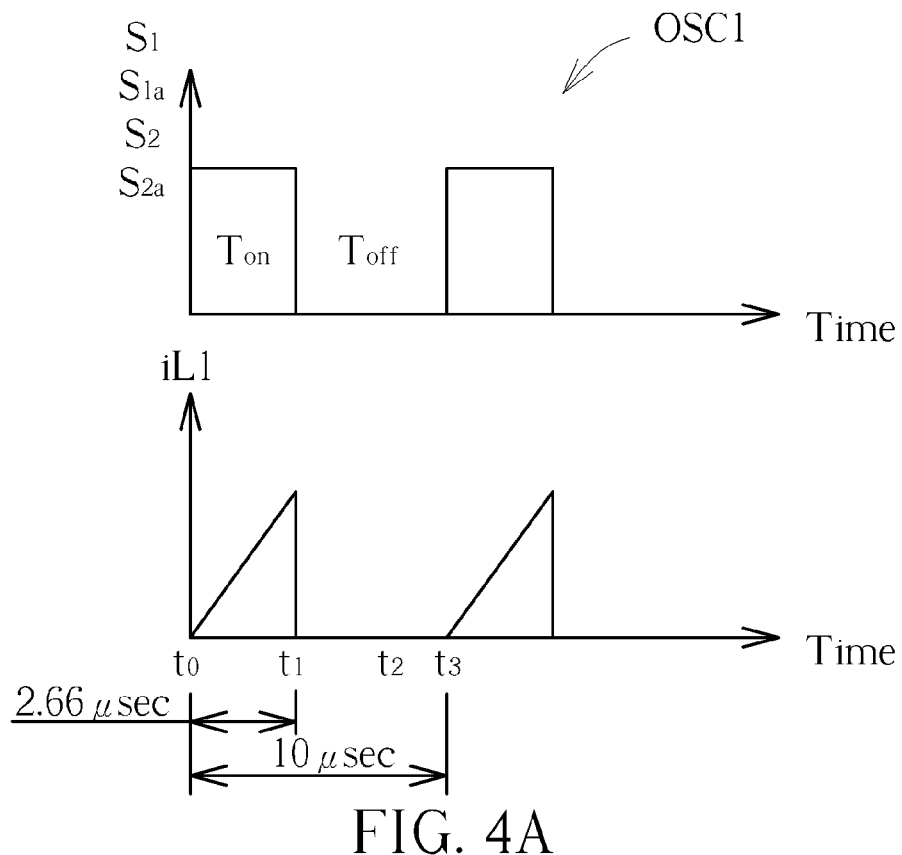
FIG. 4A, 4B are illustrations showing switch and current relation charts corresponding the embodiment in FIG. 3A, 3B respectively.
Figure 4B:
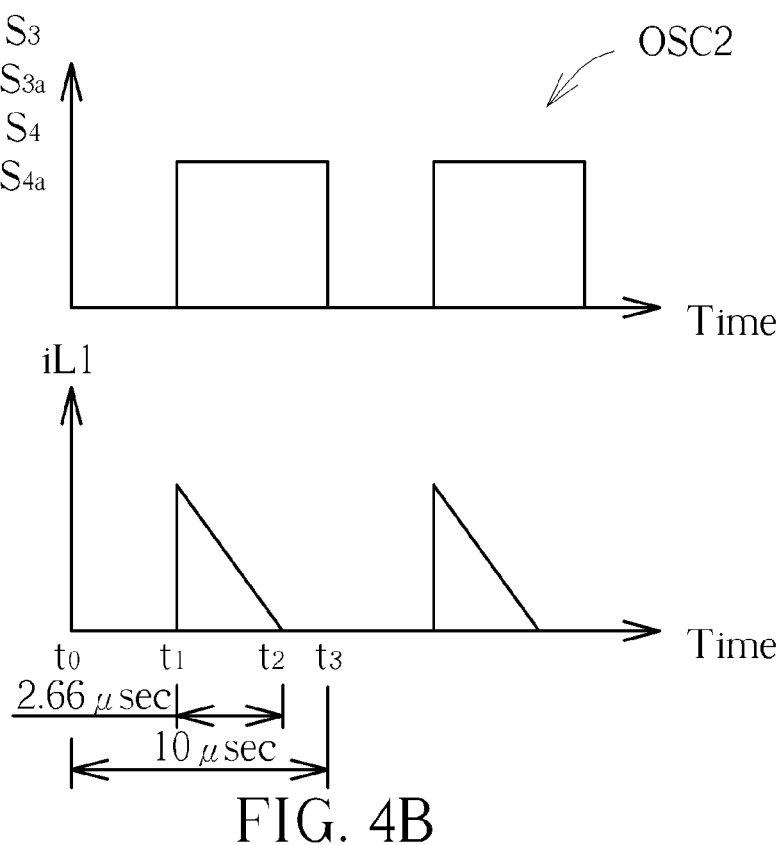

Please refer to FIG. 3A, 3B, 4A, 4B. FIG. 3A, 3B are illustrations of another embodiment of the cells and the flyback converter according to the invention and FIG. 4A, 4B are switch and inductive current (iL1) relation charts corresponding the embodiment in FIG. 3A, 3B respectively. As described, the first pulse signal OSC1 and the second pulse signal OSC2 generated by the pulse generator 60 are complementary to each other, and the pulse generator 60 is coupled to the switches S0, S1, ..., Sn–1, Sn and controls the turn-on duty and frequency of switches S0, S1, ..., Sn–1, Sn. For example, the first pulse signal OSC1 may be transmitted to control the turn-on duty and frequency of switches between a plurality of first cells 31, 32 of the first cell set 30 and the flyback converter 10, while the complementary second pulse signal OSC2 may be transmitted to control the turn-on duty and frequency of switches between a plurality of second cells 41, 42 of the second cell set 40 and the flyback converter 10.

Referring to FIG. 3A, 4A, four switches S1, S1a, S2, S2a are disposed as illustrated between the first cell 32 of the first cell set 30 (referring to FIG. 1) and the flyback converter 10. During time interval t0~t1, the first pulse signal OSC1 is high and the switches S1, S1a, S2, S2a are turned on with duty of 26.6%, but not limited to. At this stage, electrical energy (current) from the first cell 32 flows toward the flyback converter 10 and is converted into magnetic energy. Meanwhile, FIG. 4B shows that during the same time interval t0~t1, the second pulse signal OSC2 is low and the switches S3, S3a, S4, S4a are turned off, which means there is no energy flow between the second cell 42 and the flyback converter 10.

Next, in FIG. 3B, 4B, during time interval $t_1$~$t_3$, the first pulse signal OSC1 is low and the switches $S_1$, $S_{1a}$, $S_2$, $S_{2a}$ are now turned off. No energy flows between the first cell 32 and the flyback converter 10. Meanwhile, FIG. 4B shows that during the same time interval $t_1$~$t_3$, the second pulse signal OSC2 is high and the switches $S_3$, $S_{3a}$, $S_4$ are turned on, while the switch $S_{4a}$ remains turned off for some reason described later. At this stage, magnetic energy of the flyback converter 10 is converted into electrical energy (current) and flows to the second cell 42. The first pulse signal OSC1 and the second pulse signal OSC2 generated by the pulse generator 60 as high frequency pulse signals with frequency at, say, 100 KHz constantly turn on and off the switches $S_1$, $S_{1a}$, $S_2$, $S_{2a}$ and the switches $S_3$, $S_{3a}$, $S_4$, $S_{4a}$ and this provides a mechanism of converting the electrical energy of the first cell 32 into magnetic energy via the flyback converter 10 and the magnetic energy being converted into electrical energy conveyed to the second cell 42 to balance the cells.

Figure 5A:
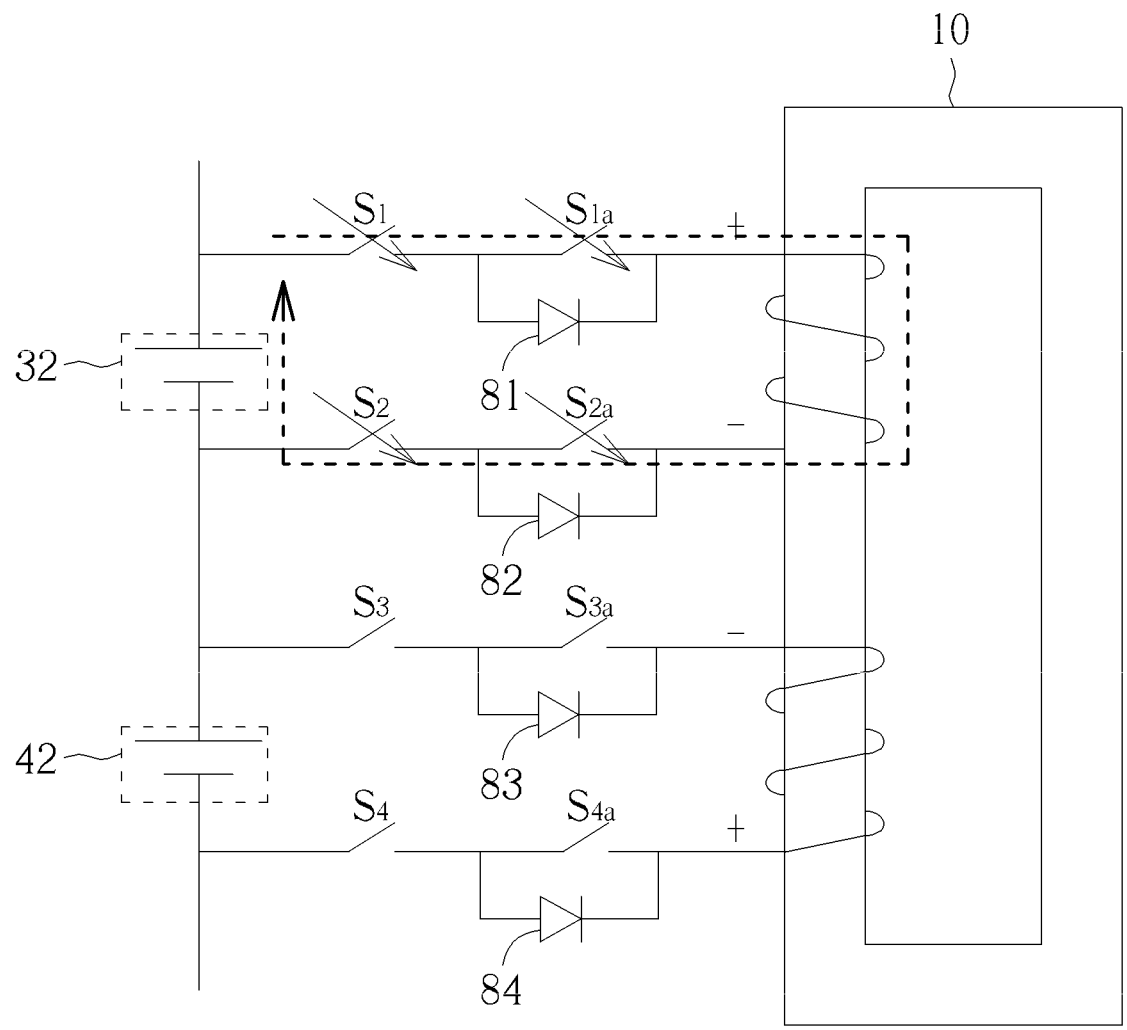
FIGS. 5A, 5B, and 5C are illustrations of the two-way direct balance circuit of the invention implemented with check circuits.
Figure 5B:
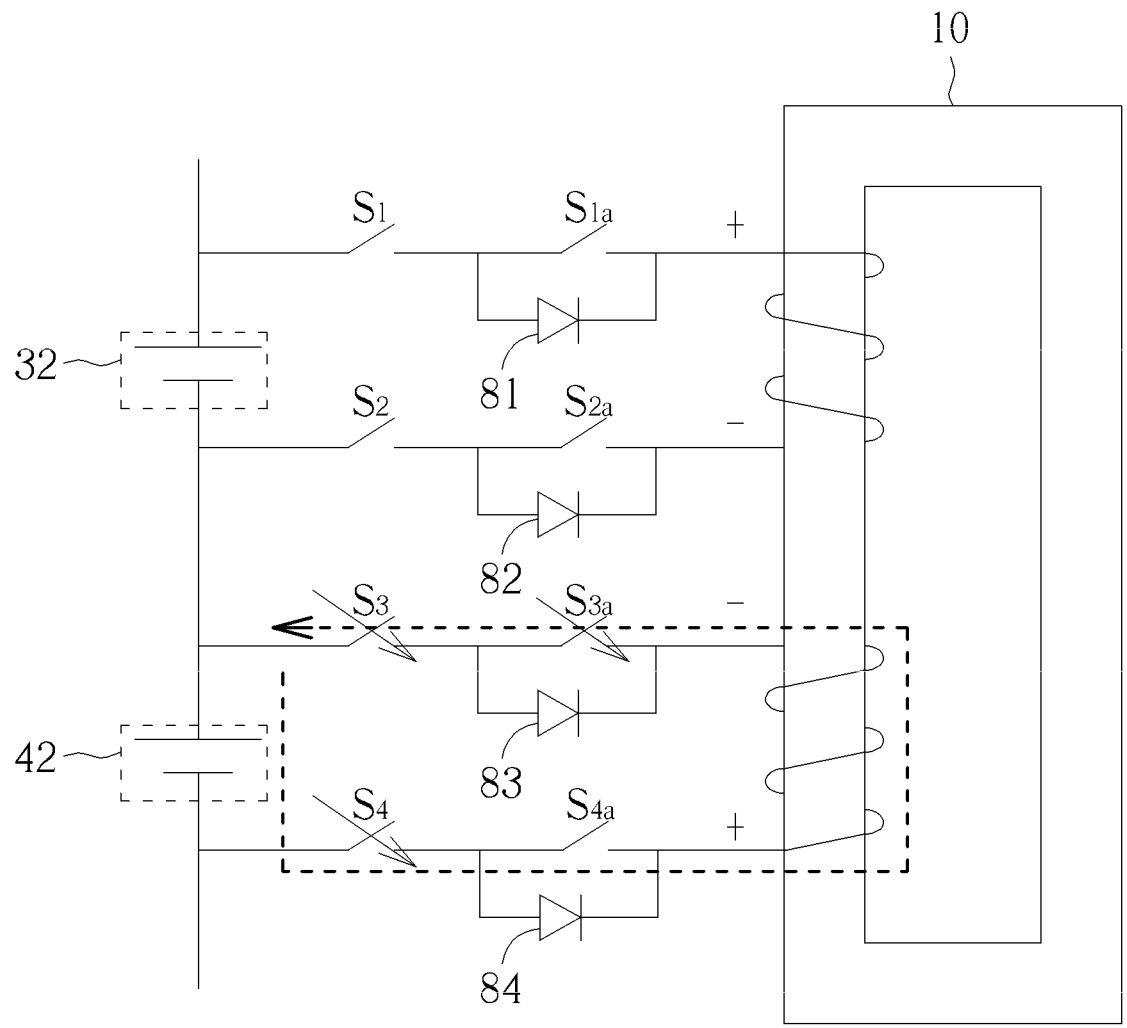
Figure 5C:
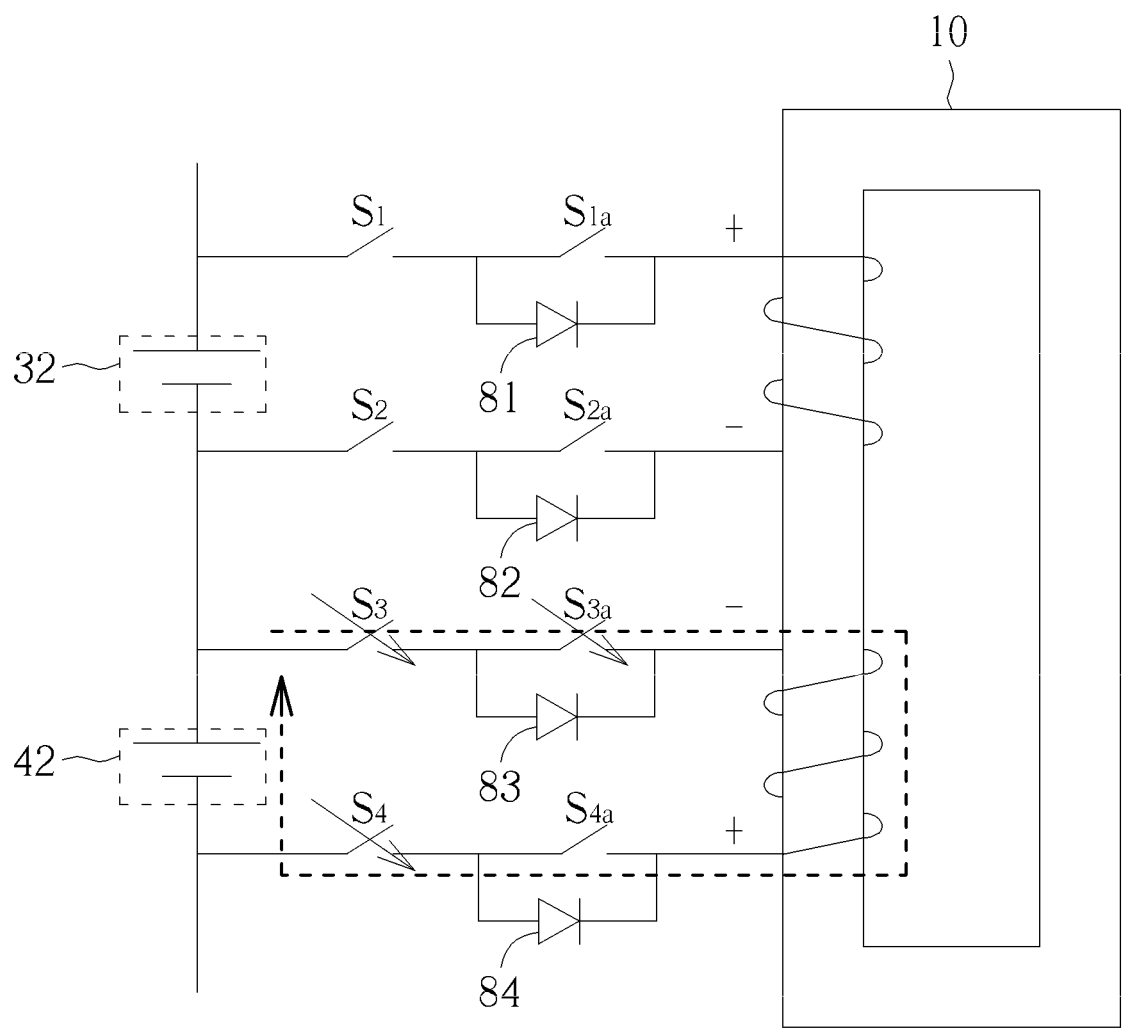

Please refer to FIGS. 5A, 5B, and 5C, which are illustrations of the two-way direct balance circuit of the invention implemented with check circuits. Referring to FIG. 5A, a check circuit is composed by transistor and switch. For example, a switch S1a and a transistor 81 in parallel connection and coupled between the first cell 32 and the flyback converter 10 form a check circuit, and a switch S2a and a transistor 82 in parallel connection and coupled between the first cell 32 and the flyback converter 10 also form a check circuit. a switch S3a and a transistor 83 in parallel connection and coupled between the second cell 42 and the flyback converter 10 form a check circuit, and a switch S4a and a transistor 84 in parallel connection and coupled between the second cell 42 and the flyback converter 10 also form a check circuit. Each of the switches S1, S1a, S2, S2a and switches S3, S3a, S4, S4a are coupled and controlled to turn on or off by the control unit 50, or through the charge pump 70, where the control unit 50 and the charge pump 70 are illustrated in FIG. 1.

FIG. 5A shows a state the same as the state in FIG. 3A, i.e., the switches $S_1$, $S_{1a}$, $S_2$, $S_{2a}$ are turned on and electrical energy (current) from the first cell 32 flows toward the flyback converter 10 and is converted into magnetic energy during time interval $t_0$~$t_1$. FIG. 5B shows a state the same as the state in FIG. 3B, i.e., the switches $S_3$, $S_{3a}$, $S_4$ are turned on, while the switch $S_{4a}$ remains turned off, and magnetic energy of the flyback converter 10 is converted into electrical energy (current) and flows to the second cell 42 during time interval $t_1$~$t_3$.

Please also refer to FIG. 4B. Since the switches $S_3$, $S_{3a}$, $S_4$ are turned on with duty of 26.6%, the flyback converter 10 will complete converting the magnetic energy into electrical energy (current) conveyed to the second cell 42 at time $t_2$. Hence, as shown in FIG. 5B, 5C, the switch $S_{4a}$ remaining turned off during time interval $t_1$~$t_3$ prevents possible current discharge from the second cell 42 to the flyback converter 10.

Figure 6A:
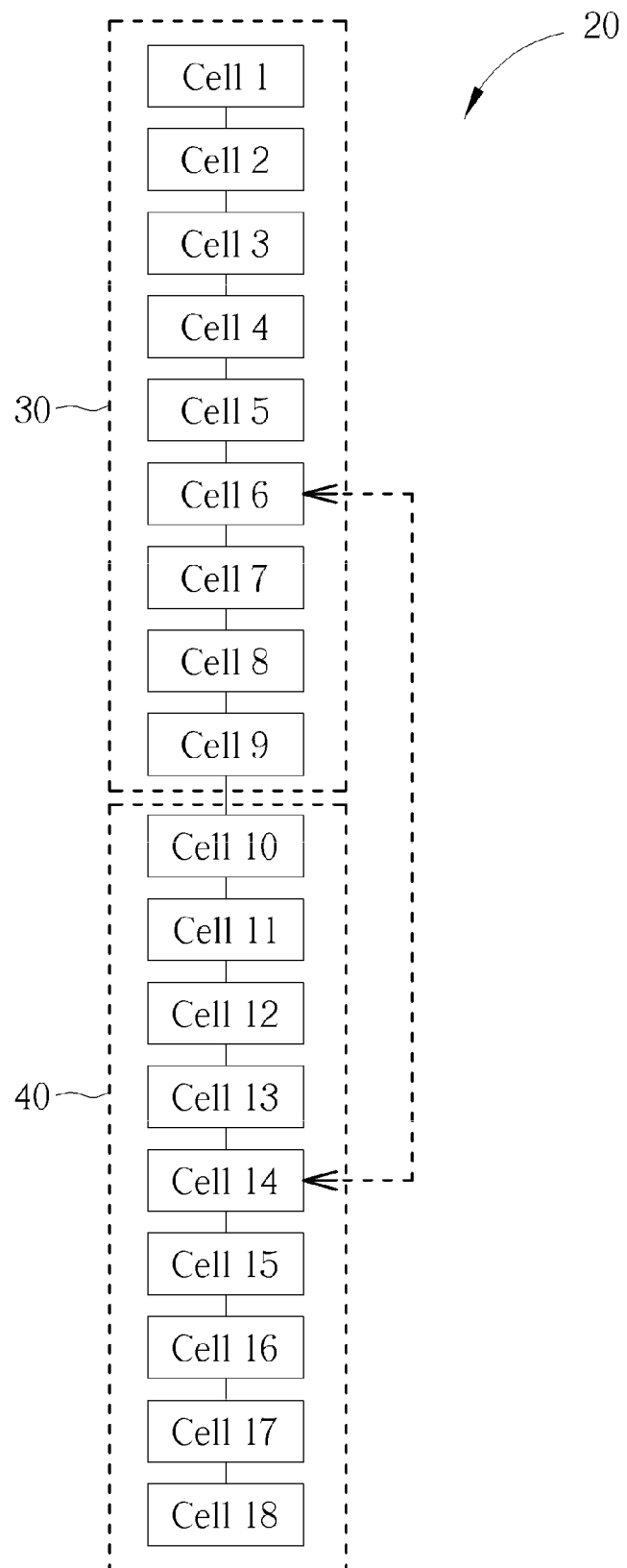
FIGS. 6A, 6B, and 6C are illustrations showing a number of balance solutions using the two-way direct balance circuit for series cells according to the invention.
Figure 6B:
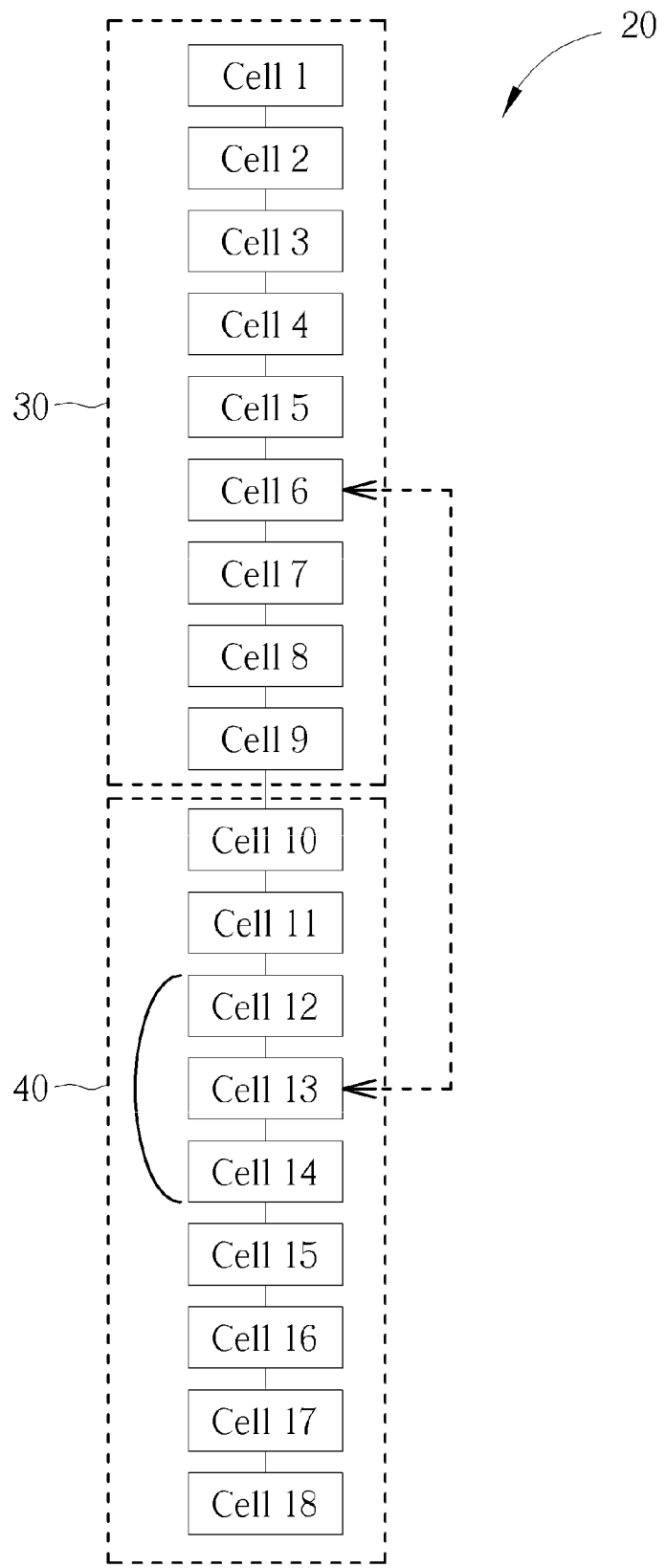
Figure 6C:
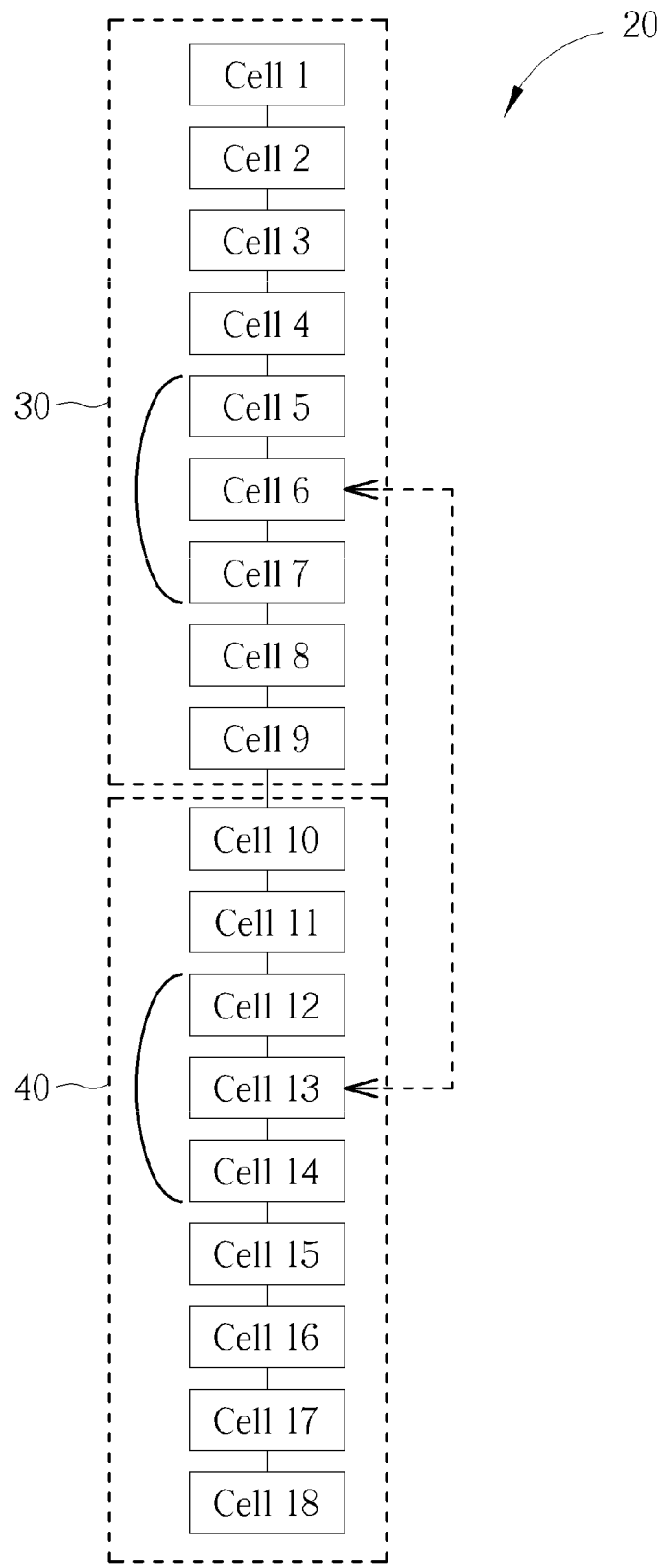

Please refer to FIGS. 6A, 6B, and 6C. As described, the control unit 50 determines which switches should be turned on and off alternately according to the RSOC of the cells so that cells corresponding to the switches being turned on and off alternately may be balanced. Furthermore, the structure in the embodiments also provide a variety of balance solutions. For example, in FIG. 6A, a first cell (cell 6) of the first cell set 30 and a second cell (cell 14) of the second cell set 40 can be balanced. In FIG. 6B, a first cell (cell 6) of the first cell set 30 and a number of second cells (cells 12~14) of the second cell set 40 can be balanced. In FIG. 6C, a number of first cells (cells 5~7) of the first cell set 30 and a number of second cells (cells 12~14) of the second cell set 40 can be balanced. It should be noted that the balance can be made bi-directional between cells of the first cell set and cells of the second cell set, which means one or more first cells can not only provide energy for one or more second cells but also receive energy from the second cells.

By monitoring the RSOC of a plurality of first cells 31, 32 of the first cell set 30 and a plurality of second cells 41, 42 of the second cell set 40, the control unit 50 is able to selectively determine which cells in both cell sets to convey energy therebetween, through a high frequency pulse signal generated by the pulse generator 60 and through electromagnetic transition provided by the flyback converter 10. During the energy exchange, the control unit 50 is able to determine if the balance process is done according to the RSOC of the cells. The pulse generator 60 will be controlled to stop generating the first pulse signal OSC1 and the second pulse signal OSC2 by the control unit 50 when the RSOC of the first cells 31, 32 and the second cells 41, 42 meets a balanced state.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A two-way direct balance circuit for series cells, comprising:
   a flyback converter;
   a first cell coupled to the flyback converter with coil, a first switch coupled between the first cell and the flyback converter;
   a second cell connected in series connection to the first cell and coupled to the flyback converter with coil, a second switch coupled between the second cell and the flyback converter;
   a control unit coupled to the first switch and the second switch; and
   a pulse generator coupled to the control unit, the first switch, and the second switch and generating a first pulse signal and a second pulse signal complementary to each other, the first pulse signal determining the turn-on frequency of the first switch and the second pulse signal determining the turn-on frequency of the second switch;

wherein when the relative state of capacity (RSOC) of the first cell is greater than the RSOC of the second cell, the control unit activates the pulse generator such that the first pulse signal turns on the first switch and the flyback converter converts electrical energy of the first cell into magnetic energy, and the second pulse signal turns on the second switch and the flyback converter converts magnetic energy into electrical energy as a power supply for the second cell;

wherein the first switch and the second switch are high level turn-on switches, the two-way direct balance circuit further comprising a charge pump coupled to the control unit and coupled between the pulse generator and the first switch and the second switch, the charge pump providing supplementary voltage for turning on the first switch and the second switch.

2. The two-way direct balance circuit for series cells of claim 1, further comprising a first check circuit and a second check circuit, the first check circuit coupled between the first cell and the flyback converter and the second check circuit coupled between the second cell and the flyback converter.

3. The two-way direct balance circuit for series cells of claim 2, wherein the first check circuit comprises a third switch and a diode in parallel connection, the second check circuit comprises a fourth switch and a diode in parallel connection, and the control unit is coupled to the third switch and the fourth switch.

4. The two-way direct balance circuit for series cells of claim 1, wherein the control unit is further monitoring the RSOC of the first cell and the second cell, and is controlling the pulse generator to stop generating the first pulse signal and the second pulse signal when the RSOC of the first cell and the second cell is balanced.

5. The two-way direct balance circuit for series cells of claim 1, wherein the first pulse signal and the second pulse signal generated by the pulse generator are high frequency pulse signals with frequency at 100 KHz.

6. A two-way direct balance circuit for series cells, comprising:
a flyback converter;
a first cell set comprising a plurality of first cells in series connection, each of the plurality of first cells coupled to the flyback converter with coil, and a first switch coupled between each of the plurality of first cells and the flyback converter;
a second cell set connected in series connection to the first cell set, the second cell set comprising a plurality of second cells in series connection, each of the plurality of second cells coupled to the flyback converter with coil, and a second switch coupled between each of the plurality of second cells and the flyback converter;
a control unit coupled to the first switch of each first cell and the second switch of each second cell; and
a pulse generator coupled to the control unit, the plurality of first switches, and the plurality of second switches and generating a first pulse signal and a second pulse signal complementary to each other, the first pulse signal determining the turn-on frequency of the plurality of first switches and the second pulse signal determining the turn-on frequency of the plurality of second switches;

wherein when the relative state of capacity (RSOC) of one or more first cells of the first cell set is greater than the RSOC of one or more second cells of the second cell set, the control unit activates the pulse generator such that the first pulse signal turns on the first switch of said one or more first cells and the flyback converter converts electrical energy of said one or more first cells into magnetic energy, and the second pulse signal turns on the second switch of said one or more second cells and the flyback converter converts magnetic energy into electrical energy as a power supply for said one or more second cells;

wherein the plurality of first switches and the plurality of second switches are high level turn-on switches, the two-way direct balance circuit further comprising a charge pump coupled to the control unit and coupled between the pulse generator and the plurality of first switches and the plurality of second switches, the charge pump providing supplementary voltage for turning on the plurality of first switches and the plurality of second switches.

7. The two-way direct balance circuit for series cells of claim 6, further comprising a plurality of first check circuits and a plurality of second check circuits, the plurality of first check circuits coupled between the plurality of first cells respectively and the flyback converter and the plurality of second check circuits coupled between the plurality of second cells respectively and the flyback converter.

8. The two-way direct balance circuit for series cells of claim 7, wherein each of the plurality of first check circuits comprises a third switch and a diode in parallel connection, each of the plurality of second check circuits comprises a fourth switch and a diode in parallel connection, and the control unit is coupled to the plurality of third switches and the plurality of fourth switches.

9. The two-way direct balance circuit for series cells of claim 6, wherein the control unit is further monitoring the RSOC of the plurality of first cells of the first cell set and the plurality of second cells of the second cells, and is controlling the pulse generator to stop generating the first pulse signal and the second pulse signal when the RSOC of said one or more first cells and said one or more second cells is balanced.

10. The two-way direct balance circuit for series cells of claim 6, wherein the first pulse signal and the second pulse signal generated by the pulse generator are high frequency pulse signals with frequency at 100 KHz.

* * * * *